United States Patent [19]

Vandekeybus

[11] Patent Number: 4,513,693
[45] Date of Patent: Apr. 30, 1985

[54] DEVICE FOR TYING-UP AN ANIMAL

[76] Inventor: Christiaan A. C. Vandekeybus, Kloosterstraat 21, B-2190 Essen, Belgium

[21] Appl. No.: 482,173

[22] Filed: Apr. 5, 1983

[30] Foreign Application Priority Data

Apr. 28, 1982 [BE] Belgium .............................. 2/59682
Jul. 9, 1982 [BE] Belgium .............................. 2/59771

[51] Int. Cl.$^3$ ............................................. A01K 1/06
[52] U.S. Cl. ................................................. 119/147 R
[58] Field of Search ................... 119/149, 147 R, 150, 119/147 A, 148, 147

[56] References Cited

U.S. PATENT DOCUMENTS

| 796,522 | 8/1905 | Mayer | 119/149 |
| 1,857,412 | 5/1932 | Sutton | 119/149 |

FOREIGN PATENT DOCUMENTS

| 2051600 | 5/1971 | Fed. Rep. of Germany ... 119/147 R |
| 2518467 | 4/1976 | Fed. Rep. of Germany ... 119/147 R |
| 2830405 | 1/1980 | Fed. Rep. of Germany ... 119/147 A |
| 2845521 | 4/1980 | Fed. Rep. of Germany ... 119/147 A |

Primary Examiner—Hugh R. Chamblee
Attorney, Agent, or Firm—Stevens, Davis, Miller & Mosher

[57] ABSTRACT

A device for tying-up an animal comprises a suspension element, a bottom yoke and two legs between the suspension element and the bottom yoke. Each leg is comprised of a top part which hinges in the suspension element and a lower part which is connected through a first hinge to the top part and through another hinge to the bottom yoke. In the open position of the yoke the lower parts and the upper parts form a parallelogram and the lower part of each leg extends downwards towards the other leg up to beyond the other hinge which forms the connection with the bottom yoke.

10 Claims, 10 Drawing Figures

DEVICE FOR TYING-UP AN ANIMAL

BACKGROUND

The invention relates to a device for tying-up an animal with:

a suspension element to be hung at the top to a fixed structure, a bottom yoke which can be connected to the fixed structure, two legs which lie between the suspension element and the bottom yoke, and which form together with the bottom yoke, one yoke, which legs are each comprised of

- a top part which hinges in the suspension element about an axis which lies at right angle to the main yoke plane and
- a lower part which hinges through a first hinge in the top part, and through at least one other hinge is connected to the bottom yoke, which hinges allow a motion in the main yoke plane and outside thereof, means which retain in the one end position, the top parts in a closing position, and in the other end position thereof, retain the top parts with the top ends thereof facing one another, in an open position, and a bolt which locks the legs at the top relative to one another, in the closing position.

Devices of this kind are particularly intended for tying-up cows.

A device of this kind is known from Belgian Pat. No. 885,292.

In this known device, as in the device according to the invention, both lower parts and both top parts of the yoke form in the open position of the yoke, a parallelogram with a horizontal diagonal in the crosswise direction of the lying-and-standing station wherein the yoke is hung.

The passage from the open position to the closing position is obtained by shortening this horizontal diagonal and consequently by lengthening the vertical diagonal of the parallelogram, which also brings said means from that outermost position wherein they retain the top parts of the yoke legs in open position, to that position wherein they bring said top parts in closing position.

In open position, wherein the vertical diagonal is shortest, the flexible elements, generally chains, with which the suspension element is hung from the fixed structure and the bottom yoke is connected to the fixed structure, actually the floor, may be stretched.

This is the case with the known device according to Belgian Pat. No. 885,292, in which the passage from the open position to the closing position is exclusively caused by the animal entering the lying-and-standing station and wanting to eat from the crib, which lies on the other side of the device relative to the side the animal comes from, pressing the bottom yoke or the lower parts of the yoke legs towards the crib.

The yoke is thus pressed towards the crib, but as the flexible elements which connect the bottom yoke and the suspension element to the fixed structure, are stretched in the open position of the yoke, this is possible but as the vertical diagonal of the parallelogram becomes longer. With a long enough lengthening of the vertical diagonal, said passage occurs. The lengthening of the vertical diagonal is dependent on the distance over which the animal pushes the yoke frontwards, but also on the length of the flexible elements. The longer such flexible elements are, the farther the yoke has to be pushed frontwards to cause the change in position, that is to bring those means which in the one end position thereof, retain the top parts in open position, and in the other end position thereof retain the top parts in closing position, to the balance position wherein they pull neither to the one nor to the other end position.

For a given lying-and-standing station, the spacing between the fixed structure at the top, for example a top beam, to which the flexible elements which bear the suspension element can be hung, and the floor of the fixed structure to which the bottom yoke is connected, is fixed, so that for a given device and a given lying-and-standing station, the length of the flexible elements is not freely selectable.

With a great height of the top beam above the floor, the flexible elements also have to be long, in such a way that the yoke has then to be pushed quite far and possibly over the crib to pass from the opening position to the closing position. Whether the animal will push the yoke far enough to close same depends on the location where the animal finds the feed which is arranged on the other side of the yoke relative to the entering position. The feed cannot be located in every lying-and-standing station far enough from the yoke for the animal to cause enough displacement of the yoke to close same, with the result that the known device according to Belgian Pat. No. 885,292 may not be applied everywhere.

Moreover, in said known device, the means which in the one end position thereof, retain the top parts in a closing position, and in the other end position thereof, retain the top parts in open position, have to be arranged very accurately, which is not always possible in practice, so that the operating reliability of the device leaves something to be desired in some conditions.

A drawback of the device according to the Belgian Patent is further that said device does not always close when animals come in which are of small build.

THE INVENTION

The invention has for object to obviate the above drawbacks.

For this purpose, in the open position of the yoke, the lower part of at least one leg extends at least with a part of it towards the other leg up to beyond at least a part of the other hinge which forms the connection with the bottom yoke.

FURTHER BACKGROUND

A device for tying-up an animal in which a lower part of each yoke leg, in open position of the yoke, extends downwards towards the other leg up to beyond a hinge which forms the connection to the bottom yoke, is known from the German Pat. No. 25 45 052.

In this known device, the legs only hinge relative to the bottom yoke which forms a rigid unit with a top gate the widest dimension of which lies at the top in the cross-wise direction of the lying-and-standing station. Above the bottom yoke, both yoke legs of said known device are in one piece, in such a way that the parallelogram shape of said legs fails completely in the open position of the yoke.

By comparison with last mentioned known device, the device according to the invention has the advantage that the opening of the open yoke is at the widest on a lower level, namely the level of the horizontal diagonal. In the known device according to the German Application, said opening is at the widest completely at the top. The entering animal which normally holds his head down as he enters the lying-and-standing station, does not have to raise his head as high, all the more so as in the device according to the invention, the bottom yoke is less high. Consequently the animal learns more easily to close the device according to the invention.

At the level where the animal holds his head when entering the lying-and-standing station, the open yoke according to the invention is wider than the yoke according to the German Application, in such a way that the animal does not put as easily his head beside the yoke of the device according to the invention.

The device according to said German Application has at the top, in the cross-wise direction of the lying-and-standing station, a wider width than the one required for the animal's head, because the yoke legs have to be guided at the top, and said width remains whether the yoke is closed or open. Consequently the arrangement of said known device requires a larger width. Hence it is difficult and dangerous for a person to pass beside the yoke from the frontside of the animal to the back or vice versa. This drawback also is obviated according to the invention.

The larger width of the known device according to the German Application, even with the yoke closed, has the drawback that a wide unit is swung to-and-fro due to the movements of the animal, and possibly said unit knocks hard against poles which stand between adjacent lying-and-standing stations.

This problem does not occur with the device according to the invention.

A device with a suspension element, two-part mutually-hinged yoke legs and a bottom yoke, is known from German Pat. No. 28 45 521. In this known device, the yoke legs may form a parallelogram in the open position, and there is further provided a discrete mechanism which is operated by the animal to bring the yoke from the open position to the closed position. Said mechanism is however much more intricate and less reliable for the closing than the lower parts projecting inwards from the yoke legs in the device according to the invention.

THE INVENTION

In a particular embodiment of the invention, the lower part is comprised of a bottom part which is connected through a second hinge the axis of which lies in the main yoke plane, to the bottom yoke, and another part which forms the center portion of the leg and which is connected to the top part through the first hinge, and to the bottom part through a third hinge the axis of which lies at right angle to the main yoke plane, and in the open position of the yoke, the center portion extends downwards towards the other leg, up to beyond the third hinge.

DESCRIPTION OF TWO PREFERRED EMBODIMENTS

Other details and advantages of the invention will stand out from the following description of two embodiments of the device for tying-up an animal according to the invention; this description is only given by way of example and does not limit the invention; the reference numerals pertain to the accompanying drawings.

THE DRAWINGS

In the various figures, the same reference numerals pertain to the same elements.

THE DESCRIPTION

The device as shown in FIGS. 1 to 5 for tying-up an animal, is mounted inside a fixed structure the floor 1 and top beam 2 are part of.

Said device is intended to retain fixedly a cow inside a lying-and-standing station. The cross-wise direction thereof corresponds to the direction of said top beam 2. The lengthwise direction lies at right angle thereto. This is the direction the animal follows as he enters normally the lying-and-standing station.

The device is comprised mainly of a suspension element 12-13-14, and a yoke which is comprised in turn of a bottom yoke 3 and yoke legs connecting thereto. Each yoke leg comprises a top part 17-18 and a lower part 19-20. Said parts 17-18-19-20 are hingedly connected together as well as to suspension element 12-13-14 and to bottom yoke 3, in the way as described in detail hereinbelow. At rest, said parts lie in one and the same plane, the so-called main yoke plane. Independently of whether the device lies in the open position or closed position as described hereinbelow, the complete device comes to lie in balanced condition in any case with the main yoke plane along a direction which corresponds to the cross-wise direction of the lying-and-standing station.

On the one side of the device extending at rest along the cross-wise direction of the lying-and-standing station, called hereinafter the front side, the lying-and-standing station is provided with a crib. The other device side is thus called the back thereof.

The suspension element wherein the top parts 17 and 18 of the yoke with which the animal is tied-up, are hingedly hung, is comprised of two plates 13 which extend, in the balance condition, along the cross-wise direction of the standing station, of a plate 12 which connects together the plates 13 on the top side, and of the spacers 14 which connect the ends of plates 13 on either side.

To suspend the suspension element 12-13-14, two small fastening clamps 7 lie about the cross-beam 2 they are retained on by bolts 8 with nuts.

A T-iron 9 hangs through two chains 10, from the fastening clamps 7. As the chains 10 are flexible hanging elements, they try under the action of the weight of said T-iron 9 and everything that hangs therefrom, to take a position wherein the center lines thereof lie in parallel relationship with one another. At rest said center lines define a vertical plane which extends in parallel relationship with the top beam 2, that is along the cross-wise direction of the lying-and-standing station.

From the following description it will also appear that the top parts 17 and 18 of the yoke extend in a vertical cross-wise plane when the T-iron 9 extends in such a plane.

Under the action of the animal, the yoke and thus the yoke parts 17 and 18 and the T-iron 9 are moved away from the cross-wise plane, but as soon as the gravity force can act freely, the yoke will return to the cross-wise plane.

The T-iron 9 forms a unit with the rod 11 and the top plate 12 of the suspension element which is welded to said rod.

Figure 1:
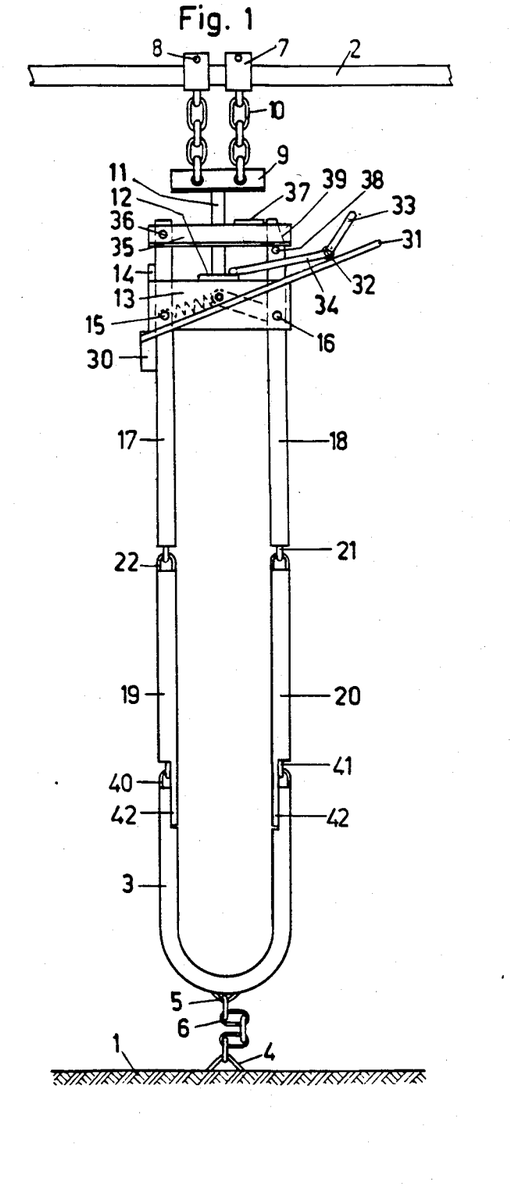
FIG. 1 is a front view of a first device for tying-up an animal according to the invention, whereby the yoke is shown in closed position.

An eye 5 which is provided at the bottom on the bottom yoke 3, is connected through a chain 6 to an eye 4 which is built-in in the floor 1 of the fixed structure. The device is thus mounted between the top beam 2 and the floor 1 through chains 10 and 6. When the device takes the closed position as shown in FIG. 1, the chain 6 hangs loose, which makes it possible for the animal to move within some limits. When such movement possibility should be limited, links of the chains 10 which are not adjacent links may be connected together at the top, for example with a simple hook, which reduces the play in the suspension.

Figure 2:
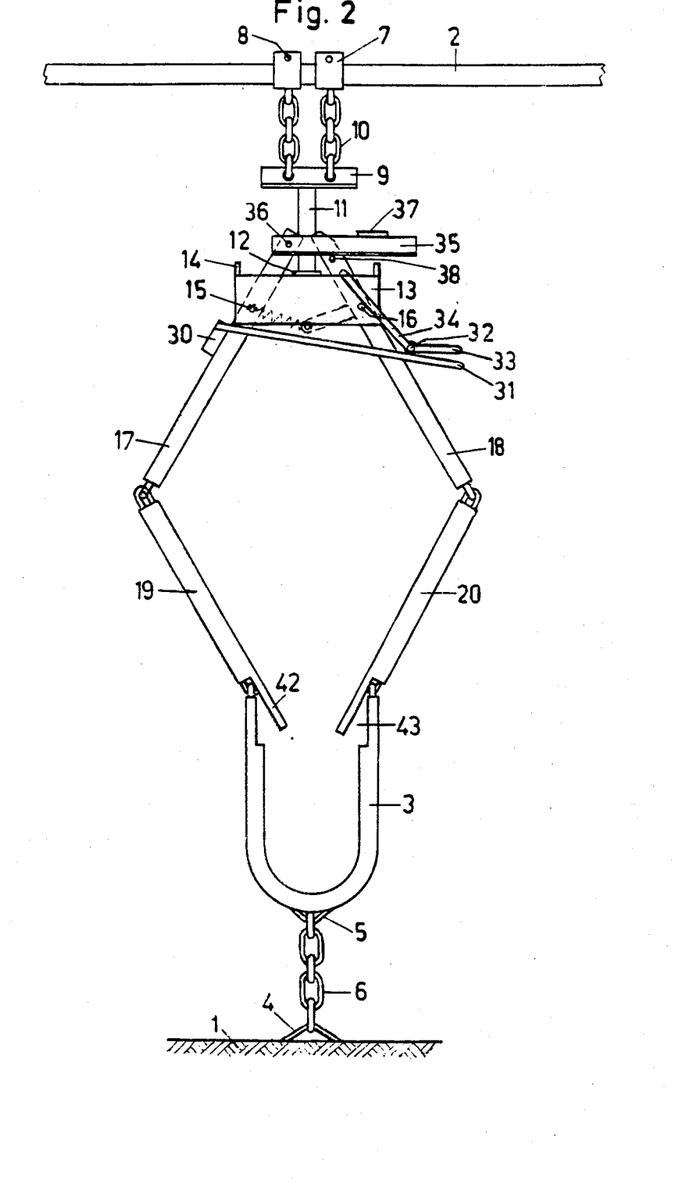
FIG. 2 is a front view of the device according to FIG. 1, whereby the yoke is shown in open position.
Figure 3:
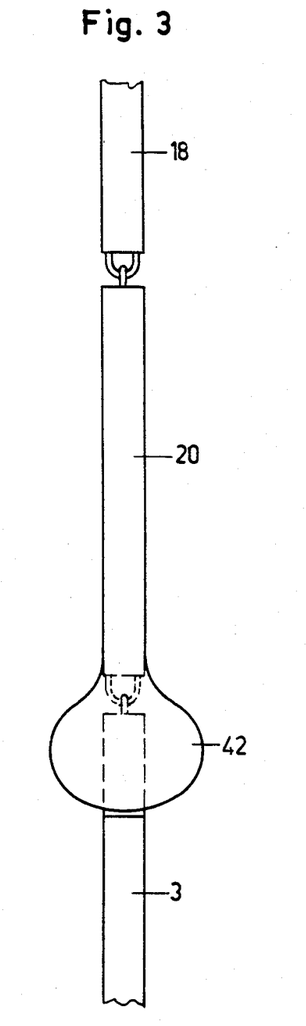
FIG. 3 is a side view of part of the device as shown in FIGS. 1 and 2.

When the device takes the open position as shown in FIG. 2, the chain 6 is less loose in such a way that the movement possibility of the open device is more limited or is even neglectible if the chain 6 is stretched.

In the plates 13 are mounted pins 15 and 16 about which hinge the top parts 17 and 18 of the yoke which ties-up the animal.

The top parts 17 and 18 thus hinge about the pins 15 and 16 which form axes which lie at right angle to the main yoke plane. By main yoke plane is meant the cross-wise plane of the standing-and-lying station wherein lie notably yoke parts 17, 18, 19 and 20 and bottom yoke 3, when the device hangs balanced in closed position.

The directions as given hereinbelow for the various eyes which connect together the yoke parts relate to such balance condition of the main yoke plane.

On the bottom ends thereof the top parts 17 and 18 of the yoke legs, bear eyes 21 which lie in parallel relationship with the lengthwise symmetry plane of the lying-and-standing station.

In said eyes 21 are engaged eyes 22 of the top ends of the lower parts 19 and 20 of the yoke. Said eyes 22 lie in parallel relationship with the vertical cross-wise plane of the lying-and-standing station.

Figure 4:
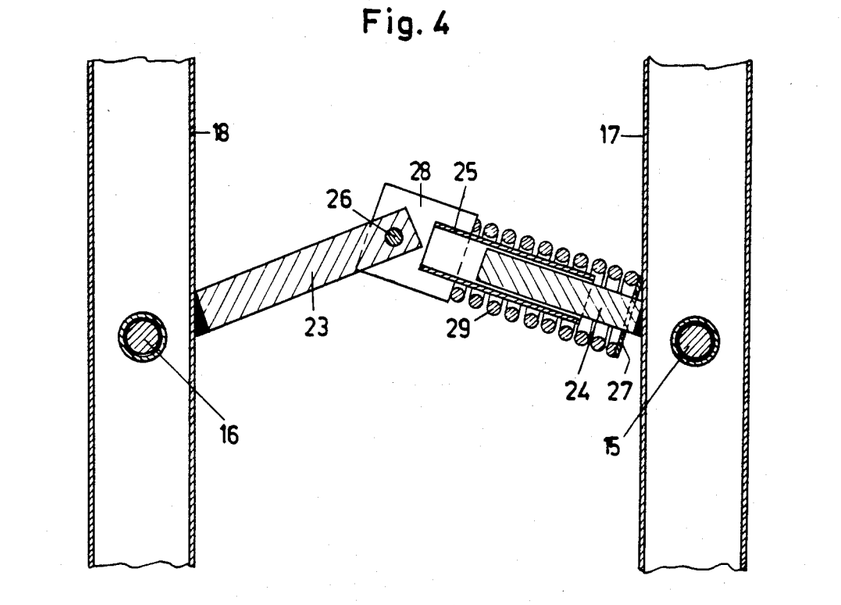
FIG. 4 is a vertical cross-section of the device as shown in FIGS. 1-3.
Figure 5:
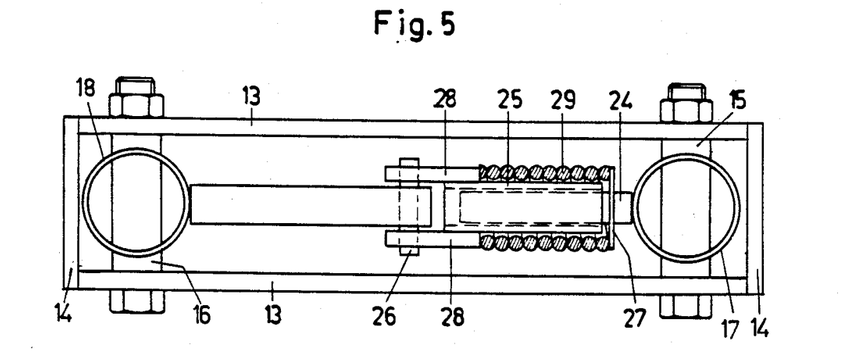
FIG. 5 is a top view of part of the device as shown in FIGS. 1-4.

The top part 18 bears approximately level with the pin 16, a projection 23. Said projection forms a fixed angle with the part 18 and is directed upwards when the part 18 lies in the closing position as shown in FIGS. 1 and 4, and the projection is directed downwards when the part 18 lies in the open position as shown in FIG. 2.

The top part 17 of the other leg also bears a projection. Said latter projection is comprised of a plurality of parts and has a varying length. Said projection is comprised of a fixed single pin 24 and a small tube 25 which is slidable to-and-fro on said pin. The pin 24 and consequently the small tube 25 which lies in the extension thereof, form the same angle with part 17 as that angle which is formed between part 18 and projection 23.

The small tube 25 bears on the end thereof, two lips 28 which are hingedly joined by a small shaft 26 to said projection 23.

A spring 29 presses on the one hand on the lips 28 which are fixed relative to the small tube 25, and on the other hand on a projecting portion 27 from the pin 24.

To the top part 17 is welded a part 30. Said part bears an arm 31. Said arm is consequently fixed relative to part 17 and extends in a plane in parallel relationship with said top parts 17 and 18 of the yoke legs.

The spring 29 constantly exerts a pressure between the leg 17 on the one side, and the lips 28 and consequently the small shaft 26 and the projection 23 on the other side. There results therefrom that in the closed position as shown in FIGS. 1 and 4, the spring 29 tries to spread the top parts 17 and 18 from one another at the top, but this is prevented due to said top parts 17 and 18 then engaging the spacers 14 of the suspension element.

In the position as shown in FIG. 2 to the contrary, and as soon as the small shaft 26 has come underneath the plane of said pins 15 and 16, the spring 29 pushes the parts 17 and 18 to the maximum away from one another, in such a way that the spring then retains or brings said top parts 17 and 18 of the yoke legs away from one another.

The arm 31 bears a small hinge shaft 32 through a connecting part not shown in the figures which retains the small shaft somewhat above the arm 31. About said shaft is arranged a lever 33-34. Said lever 33-34 lies mainly in the same plane as arm 31. A bent end only of the arm 34 which is part of said lever, extends away up to underneath the angle iron 35 which is part of a spacer member.

At the top of top part 17 is mounted a small hinge shaft 36. About said shaft 36 hinges said spacer member which is comprised of the angle iron 35, a flat iron not shown in the figures, and a connecting part 37 between both irons. The angle iron 35 lies in front of the yoke, and the flat iron behind said yoke. The spacer member extends with the main direction thereof in the plane which is defined by the top parts 17 and 18 of the yoke legs. In closed position, that is the position shown in FIG. 1, the part 18 engages the connecting part 37. The spacer member then bears with the angle iron 35 thereof on a projection 38 which is partly built-in in the top end of the top part 18 of a yoke leg.

The connecting part 37 prevents then the top parts 17 and 18 being moved from the closed position as shown in FIG. 1, to the open position as shown in FIG. 2. The top end of top part 18 may not indeed come past the connecting part 37 as long as the spacer member 35-37 has not been raised. The spacer member does not prevent the passage from the open position as shown in FIG. 2 to the closed position as shown in FIG. 1 because the top part 18 of a yoke leg has at the top a chamfered edge 39. Said chamfered edge raises the connecting part 37 and thus the spacer member 35-37 precisely during the passage from the open position as shown in FIG. 2 to the closed position as shown in FIG. 1.

When a downwards pressure is exerted on the arm 33 which forms a handle, the arm 34 of the same lever is raised. The bent end of said arm 34 then presses against the angle iron 35 and raises consequently the spacer member 35-37. The connecting part 37 then no more prevents the top of top part 18 of a yoke leg being moved towards rod 11. The end of arm 31 lying on the side of part 18 may then be moved downwards in such a way that the top parts 17 and 18 of the yoke are moved away from one another and thus pass from the position as shown in FIG. 1 to the position as shown in FIG. 2.

The small shaft 26 comes thereby underneath that plane which is defined by the cneter lines of pins 15 and 16, in such a way that the spring 29 which at first held the yoke closed, now brings the yoke to the open position as shown in FIG. 2.

As described hereinabove, the top parts 17 and 18 of the yoke legs are connected to the lower parts 19 and 20 of said yoke legs through eyes 21 and 22 which extend respectively along the lengthwise direction and the cross-wise direction of the lying-and-standing station.

The top ends of the bottom yoke 3 bear eyes 40 which lie in parallel relationship with the cross-wise plane of the lying-and-standing station. Said eyes 40 are engaged in eyes 41 which are provided at the bottom on the lower parts 19 and 20 and which extend along the lengthwise direction of the lying-and-standing station. As both the first hinges comprised of the eyes 21 and 22 which connect the top parts 17 and 18 to the lower parts 19 and 20, and the second hinges comprised of the eyes 40 and 41 which connect said lower parts to the bottom yoke 3, are comprised of eyes which extend in two planes that lie at right angle to one another, the hinged connections allow relative movements of the connected parts both in the main yoke plane and outside thereof.

The lower parts 19 and 20 of the yoke parts extend downwards towards the other leg up to beyond the hinges 40-41 through which said parts are connected to bottom yoke 3. The bottom ends of the lower parts 19 and 20 which extend past the hinges 40-41, for pallet-like buffers 42 which are received, in the closed position of the device, inside recesses 43 provided in the legs of bottom yoke 3.

The operation of the device as shown in FIGS. 1 to 5 is as follows.

The animal who enters the lying-and-standing station goes to the feed in the crib and encounters between the crib and himself the opened yoke which extends along the cross-wise direction of the lying-and-standing station in the position as shown in FIG. 2. The animal as he tries to reach the feed, pushes his head in the opening between the lower parts 19 and 20 and thus presses on the pallet-like buffers 42, what pushes said buffers 42 away from one another and consequently brings those portions of the lower parts 19 and 20 that lie above the hinges 40-41 towards one another. The top parts 17 and 18 of the yoke legs also come thereby nearer one another.

The projection 23 and the pin 24 which were directed downwards in the open position of the yoke, are directed upwards due to the hinging motions of the top parts 17 and 18 about the pins 15 and 16, whereby the spring 29 is compressed until said projection 23 and pin 24 have reached the horizontal position thereof. As soon as the projection 23 and pin 24 have moved upwards past the horizontal position, the spring 29 cooperates to move the top parts 17 and 18 away from one another above the pins 15 and 16, and thus to bring those portions of said top parts 17 and 18 below the pins 15 and 16 towards one another, what brings also the yoke in closed position. The lower parts 19 and 20 are also brought nearer one another thereby and the pallet-like buffers 42 are received in the recesses 43 in the legs of bottom yoke 3.

When the animal also pushes the yoke towards the crib, this results in the top parts 17 and 18 and the lower parts 19 and 20 being brought nearer one another, if in the open position of the yoke, the chains 6 and 10 are already stretched or if the chain 6 has a limited play. This then cooperates to the above-described passage from the yoke open position to the yoke closed position, which passage is caused by the downwards pressure the animal exerts on the buffers 42.

As the yoke reaches the closed position, the connecting part 37 of the bolt 35-37 slides over the chamfered edge 39 of the top part 18, in such a way that said connecting part 37 finally comes to lie next to the top part 18 on the side facing the top part 17 and locks the device. The way how the device is brought from the closed position to the open position by acting on the lever arms 31 and 33 has been explained hereinabove.

The device as shown in FIGS. 6 to 10 differs from the above-described device as shown in FIGS. 1 to 5 by the following features. Such features notably pertain to the fact that each one of the lower parts is comprised of a bottom part 44 which also forms the bottom part of the yoke leg, and of another part 45 which forms the middle part of the yoke leg. The features also pertain to the hinged connections between the parts of the yoke legs. Each one of the middle parts 45 which are connected by the first hinges 21-22 to the top parts 17 and 18, is extended by a buffer 46 which is integral with the middle part. The bottom parts 44 lie between the middle parts 45 and the bottom yoke 3.

Each bottom part 44 is hingedly connected on the one side to a middle part 45, and on the other side to a leg of the bottom yoke 3 by means of hinges which allow but a simple hinging motion.

A second hinge which forms the connection between the bottom part 44 and the bottom yoke 3 has the hinge axis thereof lying in the main yoke plane. Said second hinge has as hinge pin, a screw bolt 47 which is supported in two small plates 48 which are welded to the top end of a leg of the bottom yoke 3. Between said plates 48, a tube 49 which is present on the bottom end of a bottom part 44, lies about the screw bolt 47. Outside said plates 48 lie the head 50 of the screw bolt 47 and the nut 51 screwed on the other end of the bolt.

Each middle part 45 is connected to a top part 17,18 by said first hinge, which is further described below, and it is connected to the bottom part 44 by a third hinge. The axis of said third hinge lies at right angle to the main yoke plane. Each third hinge comprises as hinge pin, a screw bolt 52 which is supported in a buffer 46 which is integral with a middle part 45. About the hinge pin-forming bolt 52 lies a tube 53 which is welded to the top end of a bottom part 44. Said tube 53 lies between the legs of the buffer 46 which is U-shaped in cross-section. Outside said legs lie on the one side the head 54 of the screw bolt 52, and on the other side a nut 55 which is screwed on the other end of bolt 52.

Figure 6:
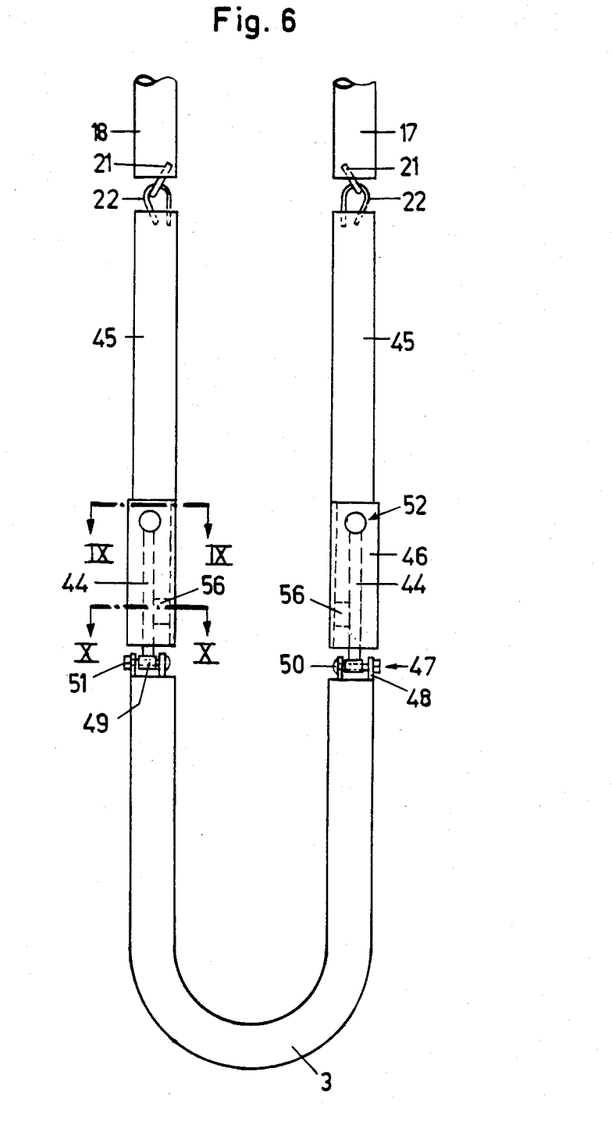
FIG. 6 is a front view of the lowermost part of a variation of the device for tying-up an animal as shown in FIGS. 1-5, whereby the yoke is shown in closed position.
Figure 7:
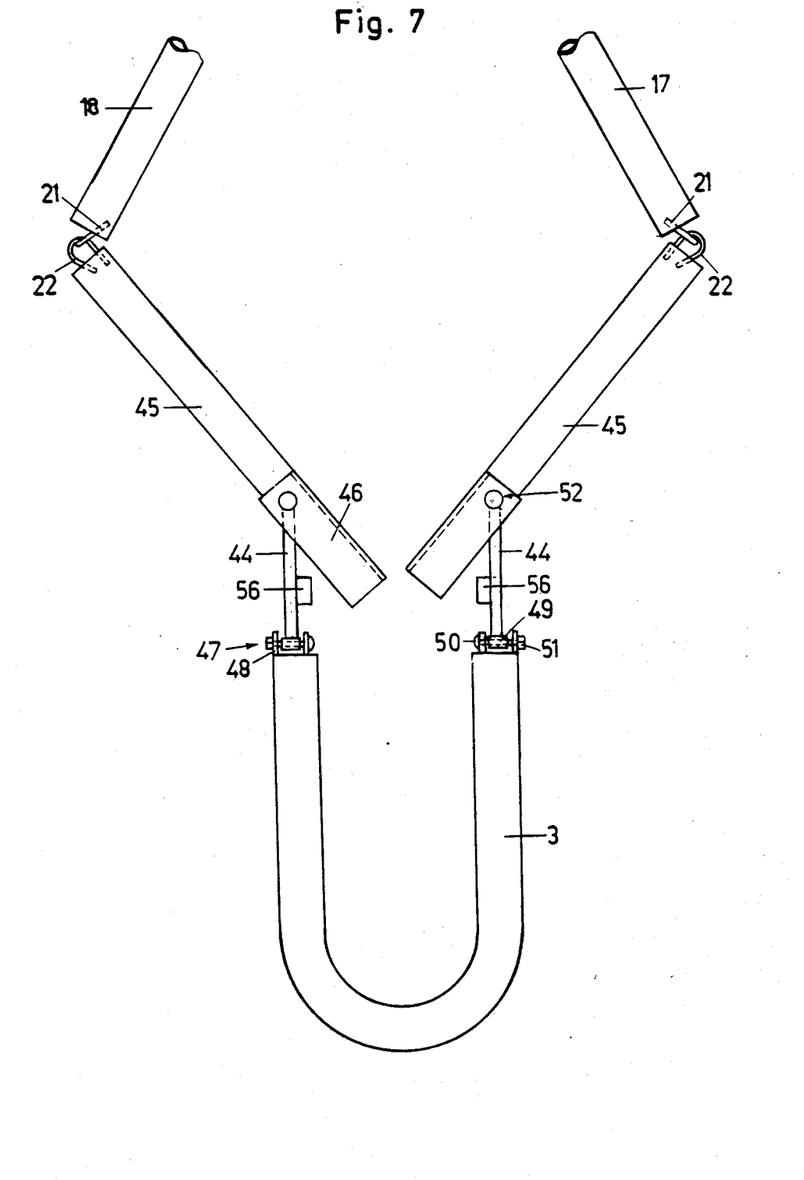
FIG. 7 is a front view of the part of the device as shown in FIG. 6, whereby the yoke is shown in open position.
Figure 8:
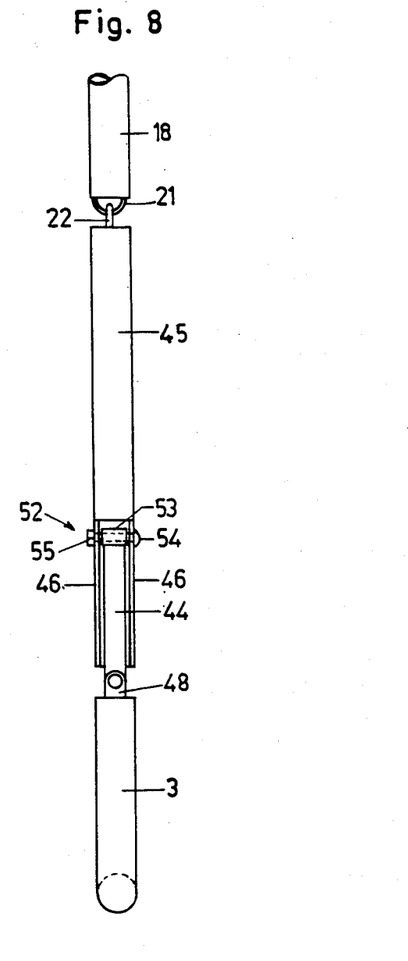
FIG. 8 is a side view of part of the device as shown in FIGS. 6 and 7, whereby the yoke takes the closed position as shown in FIG. 6.
Figure 9:
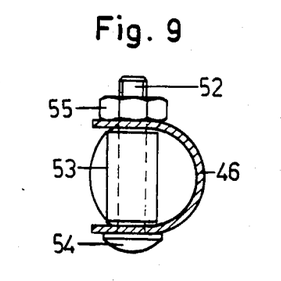
FIG. 9 shows a cross-section along line IX—IX in FIG. 6.
Figure 10:
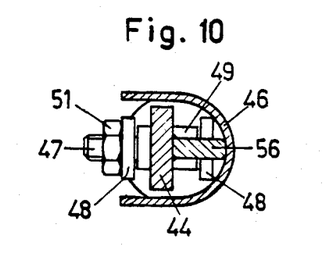
FIG. 10 shows a cross-section along line X—X in FIG. 6.

On the surfaces thereof facing one another, and thus directed to the inner side of the yoke, the bottom parts 44 bear stops 56 which the buffers 46 engage when the yoke takes the closed position as shown in FIGS. 6 and 8.

In said closed position, the buffers 46 enclose the bottom ends 44 and the stops 56 provided thereon. The animal tied inside the yoke can now actually push frontwards the middle parts 45 and thus cause a hinge motion of the middle parts 45 together with the bottom parts 44 about the hinge pins 47, but for the tied animal a hinge motion at the level of the hinge pins 52 is substantially excluded, even in the direction at right angle to the main yoke plane, even if there would be some play in the hinges with the hinge pins 52.

The entering animal closes the yoke by pushing on the buffers 46 which form actually extensions of the middle parts 45. There is also not any danger that the animal, when entering or when he is tied, should be clamped with his hide between the buffers 46 on the one hand, and the bottom parts 44 of the yoke on the other hand, due to the fact that as soon as the yoke goes to the closed position, and a fortiori when the yoke has reached the closed position, the bottom parts 44 are enclosed by the buffers 46 with a U-shaped cross-section.

In closed position, the engagement between the buffers 46 and the bottom parts 44 and the stops 56 provided thereon, is enhanced due to the hinges between the top parts 17 and 18 and the middle parts 45 lying somewhat outwards relative to the axes of said top parts 17 and 18. The eye 21 which belongs to a first hinge which connects a top part 17 or 18 to a middle part 45 and which is fixed relative to the top part 17 or 18, lies actually at right angle to the main yoke plane, but it is directed outwards when the yoke lies in closed position, as it appears mostly from FIG. 6. The middle parts 45 are pushed thereby somewhat outwards. Said parts are thus pressed with the buffers 46 thereof against the stops 56 from the bottom parts 44, at least when the yoke lies in closed position.

The invention is in no way limited to the above-described embodiments and many changes may be brought thereto within the scope of the Patent Appication, notably as regards the shape, the composition, the arrangement and the number of the components which are being used to embody the invention.

Another embodiment may particularly be used for the locking mechanism and for the means which retain in the one end position thereof, the top parts of the yoke legs in a closed position, and retain in another end position, said top parts in an open position. Use may be made therefore notably of the locking mechanism and the means which are described in the Application filed on Dec. 21, 1982 under Ser. No. 451,836, which is incorporated herewith as reference.

I claim:

1. A device for tying-up an animal comprising:
a suspension element,
a bottom yoke,
two legs forming with said bottom yoke a single yoke and defining with said suspension element and said bottom yoke a main yoke plane, each of said legs being comprised of:
a top part which hinges in the suspension element about an axis at right angle to the main yoke plane, and
a lower part which is connected through a first hinge to the top part and through another hinge to the bottom yoke,
the top part and the lower part of each leg being in line in a closed position of the yoke and the top parts and the lower parts of the two legs forming a parallelogram in an open position of the yoke, the lower part of a leg extending in said open position towards the other leg up to and beyond the other hinge which forms its connection with the bottom yoke,
means which are movable between a first end position and a second end position and which in said first end position retain the top parts in the closed position and in said second end position retain the top parts in the open position, and,
a spacer member which locks the top parts in the closed position.

2. The device of claim 1, in which the lower part of each leg extends in said open position towards the other leg up to and beyond the other hinge which forms its connection with the bottom yoke.

3. The device of claim 1, in which the lower part of each leg extends in said open position downwards towards the other leg with a portion in the shape of a pallet up to and beyond the other hinge which forms its connection with the bottom yoke, the bottom yoke having a recess which receives that portion in said closed position of the yoke.

4. A device for tying-up an animal comprising:
a suspension element,
a bottom yoke,
two legs forming with said bottom yoke a single yoke and defining with said suspension element and said bottom yoke a main yoke plane, each of said legs being comprised of:
a top part which hinges in the suspension element about an axis at right angle to the main yoke plane,
a middle part which is connected through a first hinge to the top part, and
a bottom part which is connected to the bottom yoke by a second hinge, the axis of which lies in the main yoke plane and connected to the middle part by a third hinge, the axis of which lies at right angle to the main yoke plane,
the top part, the middle part and the lower part of each leg being substantially in line in a closed position of the yoke and the top parts and the middle parts of the two legs forming a parallelogram in an open position of the yoke, the middle part of each leg extending in said open position towards the other leg up to and beyond the third hinge which forms its connection with the bottom part of the leg,
means which are movable between a first end position and a second end position and which in said first end position retain the top parts in the closed position and in said second end position retain the top parts in the open position, and,
a spacer member which locks the top parts in the closed position.

5. The device of claim 4, in which in the closed position the middle part of a leg extends up to and beyond the third hinge with a portion, said portion and the bottom part of the same leg engaging about one another in said closed position.

6. The device of claim 4, in which in the closed position the middle part of a leg extends up to and beyond the third hinge with a portion which encloses the bottom part in said closed position.

7. The device of claim 4, in which in the closed position the middle part of a leg extends up to and beyond the third hinge with a portion having a U-shaped cross-section with the base directed to the other leg, said portion enclosing the bottom part of the same leg in said closed position.

8. The device of claim 4, in which in the closed position the middle part of a leg extends up to beyond the third hinge with a portion having a U-shaped cross-section with the base directed to the other leg, said portion enclosing the bottom part of the same leg in said closed position, a stop being provided on said bottom part and said bottom part engaging said middle part with said stop.

9. The device of claim 4, in which said top part has a substantially vertical axis in the closed position and the first hinge lies outwards relative to this axis.

10. The device of claim 4, in which the first hinge is comprised of two mutually-engaging eyes, one of these eyes being fixed relative to the top part, said eye lying at right angle to the main yoke plane and being directed outwards of the yoke.

* * * * *